United States Patent
Haas

(10) Patent No.: US 7,142,958 B2
(45) Date of Patent: Nov. 28, 2006

(54) METHOD AND DEVICE FOR RECOGNIZING RAISED WHEELS OF A VEHICLE

(75) Inventor: Hardy Haas, Dietzingen-Shoeckingen (DE)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 10/474,528

(22) PCT Filed: Jan. 30, 2003

(86) PCT No.: PCT/DE03/00250

§ 371 (c)(1),
(2), (4) Date: Mar. 31, 2004

(87) PCT Pub. No.: WO03/072397

PCT Pub. Date: Sep. 4, 2003

(65) Prior Publication Data

US 2004/0158368 A1 Aug. 12, 2004

(30) Foreign Application Priority Data

Feb. 27, 2002 (DE) ............................... 102 08 619

(51) Int. Cl.
*B60R 16/02* (2006.01)
*G06F 17/00* (2006.01)
(52) U.S. Cl. ............................. 701/29; 701/70; 701/72; 701/79; 340/440
(58) Field of Classification Search .................... 701/1, 701/29, 72, 73, 79, 70, 69, 84, 90; 340/440, 340/429
See application file for complete search history.

(56) References Cited

U.S. PATENT DOCUMENTS

| | | | | |
|---|---|---|---|---|
| 6,088,637 A | * | 7/2000 | Acker et al. | 701/38 |
| 6,321,141 B1 | | 11/2001 | Leimbach | 701/1 |
| 6,438,464 B1 | * | 8/2002 | Woywod et al. | 701/1 |
| 6,756,890 B1 | * | 6/2004 | Schramm et al. | 340/440 |
| 6,918,638 B1 | * | 7/2005 | Schneider et al. | 303/140 |
| 6,954,140 B1 | * | 10/2005 | Holler | 340/438 |

FOREIGN PATENT DOCUMENTS

| | | |
|---|---|---|
| DE | 197 51 925 | 5/1999 |
| DE | 198 30 190 | 10/1999 |
| DE | 198 56 303 | 1/2000 |
| EP | 0 758 601 | 2/1997 |

\* cited by examiner

*Primary Examiner*—Tan Q. Nguyen
(74) *Attorney, Agent, or Firm*—Kenyon & Kenyon LLP

(57) ABSTRACT

A method of detecting a transverse-dynamically hazardous operating state of a vehicle, where a variable describing the rotational speed of at least one wheel on an axle is determined; a first variable describing the vehicle transverse dynamics is determined from at least the one variable describing the wheel rotational speed; at least one second variable describing the vehicle transverse dynamics is determined from sensor signals; and the transverse-dynamically hazardous state is detected at least as a function of the first variable describing the vehicle transverse dynamics and the second variable describing the vehicle transverse dynamics. The transverse-dynamically hazardous operating state is defined by this wheel on the axle lifting off the roadway or by an imminent danger of this wheel lifting off the roadway; and the transverse-dynamically hazardous operating state is detected as a function of the engine torque ($M_{mot}$) acting upon this axle.

7 Claims, 4 Drawing Sheets

METHOD AND DEVICE FOR RECOGNIZING RAISED WHEELS OF A VEHICLE

FIELD OF THE INVENTION

The present invention is directed to a method of detecting a transverse-dynamically hazardous operating state of a vehicle.

BACKGROUND INFORMATION

A method and a device for detecting a tendency to tilt around a vehicle axis oriented in the longitudinal direction of the vehicle is described in German Published Patent Application No. 197 51 925.

For this purpose, a variable describing the rotational speed of at least one wheel and at least one variable representing the transverse dynamics of the vehicle are determined. As a function of a variable representing the vehicle transverse dynamics, brief braking and/or drive torques are generated and/or modified on at least one wheel. While the braking and/or drive torques on the at least one wheel are being briefly generated and/or modified, and/or after they have been generated and/or modified, a variable that quantitatively describes the wheel behavior is determined for at least this one wheel as a function of the variable describing the rotational speed of this wheel. As a function of this variable, a determination is made as to whether the vehicle is showing a tendency to tilt around a vehicle axis oriented in the longitudinal direction of the vehicle.

A method and a device for determining the danger of a motor vehicle overturning is known from German Published Patent Application No. 198 56 303. The roll angle of a cornering vehicle that has at least one axle and at least two wheels and is equipped with transverse acceleration sensors that sense the transverse acceleration acting upon the center of gravity of the motor vehicle in the horizontal plane of the vehicle is determined thereby. To provide a method that does not require additional sensors and is largely independent of given vehicle characteristics and dimensions,

- the component of transverse acceleration that acts largely in the horizontal plane is detected by the transverse acceleration sensors during cornering;
- a state variable correlating to the centrifugal acceleration acting upon the center of gravity is determined;
- and the roll angle of the vehicle is calculated from the difference, weighted by a factor, between the detected component of transverse acceleration and the determined centrifugal acceleration.

SUMMARY OF THE INVENTION

The present invention is directed to a method of detecting a transverse-dynamically hazardous operating state of a vehicle in which

- a variable describing the rotational speed of at least one wheel on an axle is determined;
- a first variable describing the vehicle transverse dynamics is determined from the at least one variable describing the wheel rotational speed;
- at least one second variable describing the vehicle transverse dynamics is determined from sensor signals; and
- the transverse-dynamically hazardous operating state is detected at least as a function of the first variable describing the vehicle transverse dynamics and the second variable describing the vehicle transverse dynamics.

According to the present invention

- the transverse-dynamically hazardous operating state is defined by this wheel on this axle lifting off the roadway or by an imminent danger of the wheel lifting off the roadway; and
- the transverse-dynamically hazardous operating state is determined as a function of the engine torque acting upon the axle of this wheel.

This provides a sound and easy-to-implement means of detecting an imminent lift risk or the lifting of a wheel, since the wheel rotational speeds and engine torque, in particular, are available in the form of determined variables in nearly all modern vehicles. At the same time, the present invention makes it possible to detect lifted vehicle wheels without test braking or test acceleration.

According to one advantageous embodiment, the imminent danger of the wheel lifting is characterized by the fact that the wheel slip has a value that is considerably different from zero. The process of a wheel lifting off the ground begins as the wheel slip value increases, since the tire loses contact with the roadway. This is associated with a decrease in the coefficient of friction between the tire and roadway. The method takes advantage of this characteristic.

According to a further advantageous embodiment, the first and second variables describing the vehicle transverse dynamics are the variables representing the transverse acceleration (or the transverse acceleration itself). This variable is easily detectable using sensor means. Only the transverse acceleration, wheel rotational speeds, and engine torque are needed as input variables. In particular, the method works without any expensive pressure sensors.

When determining the transverse-dynamically hazardous operating state, it is advantageous to differentiate between whether the wheel belongs to a driven or a non-driven axle. Wheels on these different axles demonstrate completely different rotational behaviors when they have lifted entirely or nearly entirely from the roadway. Their rotational behavior is also different from that of wheels that are not affected by a lift risk or by actual lifting. The present invention takes advantage of this difference.

According to one advantageous embodiment, a further determination is made, in the event that the wheel belongs to a driven axle, as to whether the vehicle is being accelerated or operated in overrun. Important and easily detectable differences in the rotational behavior occur here as well.

It is advantageous for the transverse-dynamically hazardous operating state to be detected only when the amount of transverse acceleration exceeds a predefinable threshold value. Soft substrates like snow and sand may corrupt wheel rotational speeds even during linear travel to the extent that they are misinterpreted as wheel lift. Because of this, a query is provided to ensure that the vehicle retains a high coefficient of friction during cornering.

According to an advantageous embodiment, the transverse-dynamically hazardous operating state is determined by evaluating inequations that include the first variable describing the vehicle transverse dynamics and the second variable describing the vehicle transverse dynamics, and by determining the form of the inequation via the engine torque (Mmot) acting upon the wheel axle. These inequations may be easily stored in a control unit (e.g., the control unit of a vehicle dynamics control system).

The formulation that

"a first variable describing the vehicle transverse dynamics is determined from the at least one wheel rotational speed"

takes into account the ability to determine a first variable describing the vehicle transverse dynamics from the variable describing the wheel rotational speed and a further variable, for example, the steering angle. As described in the exemplary embodiment, it is of course conceivable to determine a first variable describing the vehicle transverse dynamics from at least two variables describing the wheel rotational speed.

It is even conceivable to determine a first variable describing the vehicle transverse dynamics from at least two variables describing the wheel rotational speed, the at least two variables describing the wheel rotational speed being assigned to two wheels on a single axle.

The present invention also covers a system for carrying out the method according to the present invention.

DETAILED DESCRIPTION

Figure 1:
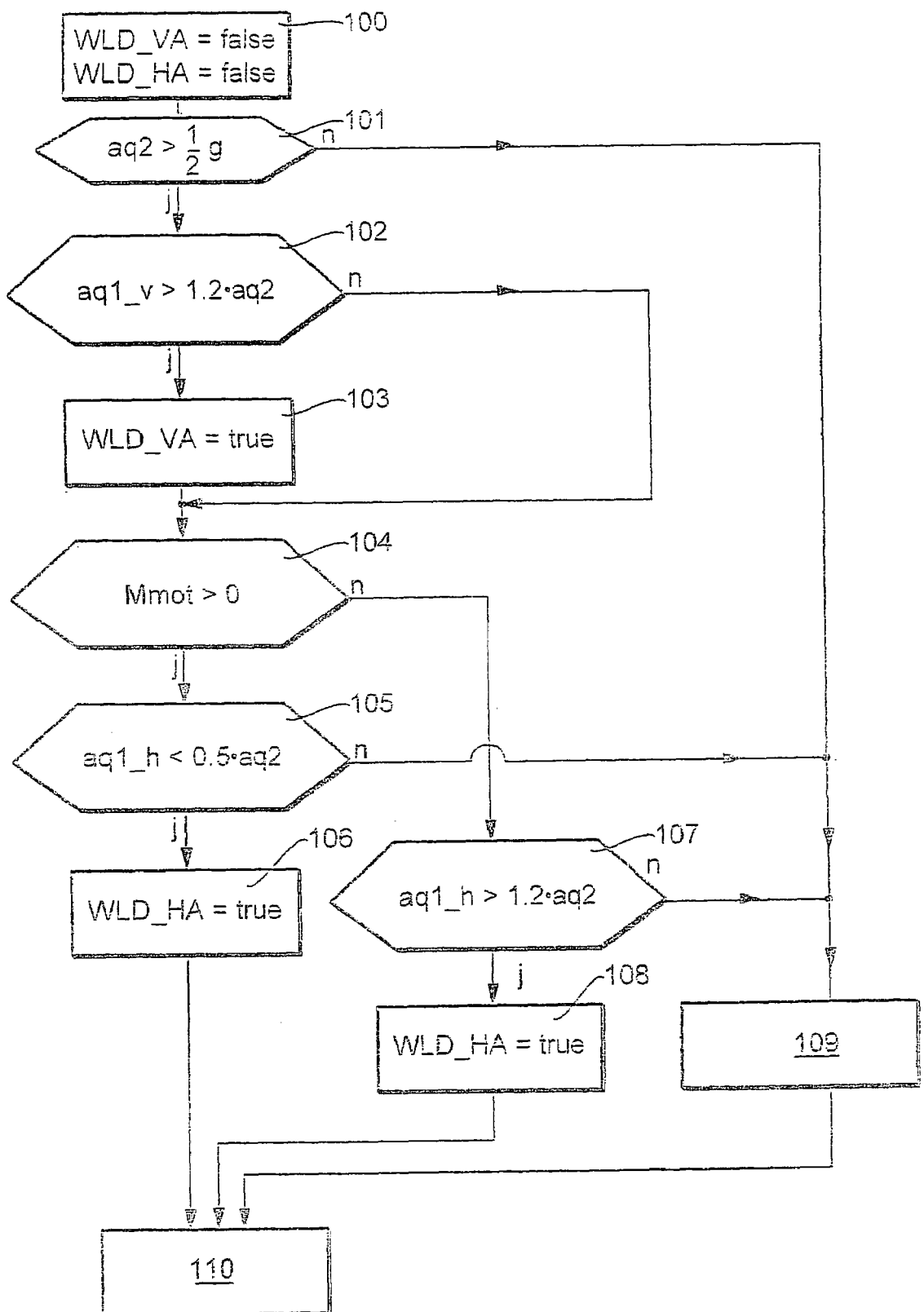
FIG. 1 shows a simplified flowchart of the method according to the present invention for a rear-drive vehicle.

In the exemplary embodiments, the method is explained on the basis of transverse acceleration signals. The method is based on a comparison between the second transverse acceleration signal supplied by a transverse acceleration sensor and a first transverse acceleration signal calculated from the wheel rotational speeds. First transverse acceleration signal aq1 may be calculated from the rotational speeds of the two wheels on the same axle, for example on the basis of the relation $$aq1=(v\text{outside}-v\text{inside})*v0/S.$$

In this relation, voutside is the rotational speed of the wheel on the outside of the curve; vinside is the rotational speed of the wheel on the inside of the curve; v0 is the vehicle speed; and S is the vehicle wheel gauge. This relation supplies the correct transverse acceleration only if zero is assumed for the wheel slip. In the case of wheels that are about to lift or already have lifted, this is no longer the case, since the slip has already assumed values substantially different from zero. In the case of spinning wheels (the vehicle does not move, i.e., the longitudinal vehicle speed is zero), the wheel slip assumes a maximum value of 1.

The present invention is therefore based on the fact that, when a wheel lifts completely or almost completely off the roadway, significant errors occur in the first transverse acceleration signal calculated from the wheel rotational speeds and are interpretable as alleviating the load on the wheels.

In the interest of simplicity, the following nomenclature is used below: in referring to a lifted wheel, we mean not only a completely lifted wheel, but also an almost completely lifted one (which is still in slight contact with the road surface).

The errors in the first transverse acceleration signal calculated from the wheel rotational speeds are classified as follows:

Case 1:

The wheel rotational speed of the lifted wheel on the inside of the curve decreases at the non-driven axle as a result of bearing friction and possibly worn brake linings. This increases the rotational speed difference in relation to the wheel on the outside of the curve; the difference in wheel rotational speeds (voutside to vinside) grows. This substantially and excessively increases calculated first transverse acceleration aq1 over measured second transverse acceleration aq2.

Case 2:

A wheel on the driven axle having an engine torque Mmot>0 which drives the axle is monitored. The vehicle is in acceleration mode. Because a nearly lifted or completely lifted wheel on the inside of the curve is able to rotate almost freely, the wheel is increasingly subjected to drive slip, and the wheel rotational speed difference in relation to the corresponding wheel on the outside of the curve decreases. The calculated first transverse acceleration thus assumes an excessively low value.

Case 3:

A wheel on the driven axle having an engine torque Mmot<0 that drives the axle is monitored. The vehicle is in overrun mode. The wheel undergoes a slight drag slip, and the wheel rotational speed difference relative to the corresponding wheel on the outside of the curve increases. The first calculated transverse acceleration thus assumes an excessively high value, like in the case of the non-driven axle.

FIG. 1 shows the method according to the present invention for a rear-drive vehicle. In rear-drive vehicles, the wheels on the front axle are the non-driven wheels, while the wheels on the rear axle are referred to as driven wheels. The wheels on the inside of the curve are always subject to a lift risk. That is why the front wheel (or the front axle) on the inside of the curve and the rear wheel (or the rear axle) on the inside of the curve are each assigned a flag that displays the status of whether the wheel has been affected by an imminent lift risk or has already lifted;

or whether the wheel is not in danger of lifting.

The flags for the rear wheel on the inside of the curve (WLD_HA) and the front wheel on the inside of the curve (WLD_VA) are set in block 100 so that they do not indicate a lift risk: WLD_HA=false and WLD_VA=false.

In this case, WLD_VA=false means that the front-axle wheel on the inside of the curve has not lifted. WLD_HA=false means that the rear-axle wheel on the inside of the curve has not lifted.

The method is then used to check the status of these flags. For this purpose, a first query ag2>0.5*g takes place in block 101. For example, aq2 is the transverse acceleration measured by a transverse acceleration sensor, while 0.5*g is half the acceleration due to gravity and represents an example of a threshold value. If this threshold value does not exceed transverse acceleration aq2, block 101 branches to block 109. Additional evaluation means, for example, may be implemented in block 109. This is physically due to the fact that the transverse acceleration has not exceeded any critical thresholds, and therefore the wheels are not in danger of lifting. However, if transverse acceleration aq2 exceeds critical threshold 0.5*g, a further query takes place in block 102 as follows:

$$aq1\_v > 1.2*aq2.$$

This query checks whether the non-driven front-axle wheel on the inside of the curve is the one that has lifted (case 1 mentioned earlier is checked here). If this condition is met, i.e., if an actual or imminent lift of the front wheel on the inside of the curve is detected, the flag assigned to the front wheel on the inside of the curve, i.e., the front axle, is set in block 103 to the status that signals a lift: WLD_VA=true. However, if the query condition in block 102 is not met, the method branches to block 104. Value 1.2 was selected only by way of example.

After the state of the front wheel on the inside of the curve has been detected in blocks 102 and 103, the rear wheel on the inside of the curve is checked, starting with block 104. For this purpose, the following query is carried out in block 104: Mmot>0? Mmot is the power output by the engine. If Mmot>0, the vehicle is in acceleration mode. If Mmot<0, the vehicle is in overrun mode. If condition 104 is met, a new query takes place in block 105 as follows:

$$aq1\_H < 0.5*aq2.$$

Note that value 0.5 was selected here only by way of example. It is also conceivable, in particular, to select a value of 0 instead of 0.5. In this case, the query condition is aq1_h<0, and wheel lift is detected when transverse acceleration aq1_h calculated from the wheel rotational speeds has the opposite sign from that of determined transverse acceleration aq2.

The query in block 105 checks whether the rear wheel on the inside of the curve has lifted in acceleration mode (Mmot>0) (this corresponds to Case 2 mentioned above). If this wheel has lifted, i.e., if the answer to the condition in block 105 may be yes, the flag assigned to the rear wheel on the inside of the curve is set in block 106 so that it indicates a lift state: WLD_HA=true.

If the answer to this condition is no, the method branches to block 109 and no wheel on the rear axle has lifted.

However, if condition Mmot>0 is not met in block 104, i.e., if the vehicle is in the overrun mode, query aq1_h>1.2*aq2 is carried out in block 107 (this corresponds to Case 3 mentioned above). If the answer to this query is no, the method branches to block 109, and no wheel on the rear axle has lifted.

If the answer to this query is yes, block 108 determines that the rear wheel on the inside of the curve has lifted. The output signals of blocks 106, 108, and 109 are forwarded to block 110. This block marks the end of the method. It is possible, in turn, to connect block 110 to block 100, i.e., rechecking the status of the wheels after the method has completed its cycle. The method may thus run continuously at regular or irregular intervals.

A lifted vehicle wheel is also detected in block 110 by evaluating flags WLD_VA and WLD_HA. For example, this allows suitable measures to be taken to prevent the wheels from lifting.

Figure 2:
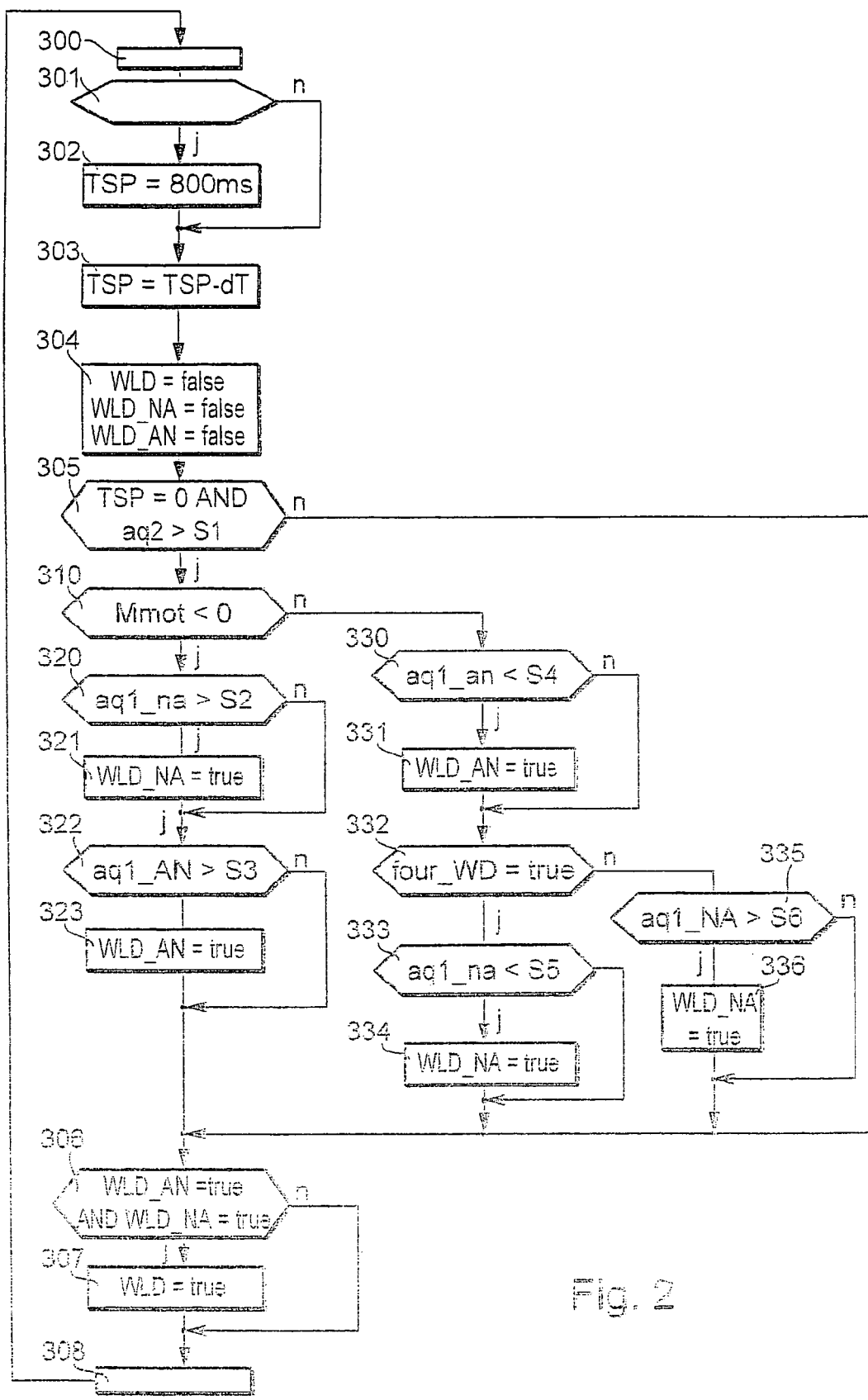
FIG. 2 shows a more complex flowchart of the method according to the present invention for a vehicle that may be operated using all-wheel drive.

FIG. 2 shows the algorithm for a vehicle that operates in all-wheel drive. In this case, a vehicle having an engagable all-wheel drive is discussed, and the following nomenclature is used:

the "driven axle" is the vehicle axle that is driven (even when all-wheel drive is deactivated).

the axle which is engagable by the all-wheel drive is referred to as the "non-driven axle."

The method according to the present invention begins in block 300. A number of checks then take place in block 301.

Check 1: This checks whether the brake light has been activated.

Check 2: This checks whether a tire tolerance adjustment is currently being carried out.

Check 3: This checks whether the transverse acceleration sensor is operating properly.

Check 4: This checks whether the transverse acceleration differential divided by the time differential, i.e., the variation of transverse acceleration over time, has exceeded a pre-definable threshold value.

Check 5: This checks whether active brake intervention by a vehicle dynamics control system or another system such as an anti-spin or anti-lock system is taking place.

If at least one of these conditions is met, a timer TSP is set to a value of 800 ms in block 302 (the value of 800 was selected only by way of example). This means that no check to determine whether a wheel has lifted should be carried out during this time interval (blocking period). If all conditions are not met at the same time, the method branches to block 303. The time is decremented in block 303: TSP=TSP−dT. dT is a time constant, for example on the order of magnitude of 10 ms. The flags are then set as follows in block 304: WLD=false, WLD_NA=false and WLD_AN=false. WLD indicates whether at least one wheel has lifted. WLD_NA indicates whether a wheel on a non-driven axle has lifted, while WLD_AN identifies whether a wheel on a driven axle has lifted (the status "true" for these flags always means that the corresponding wheel has lifted).

Two queries TSP=0 and aq2>S1 then take place in block 305. This query checks whether blocking period TSP has already ended; and whether measured transverse acceleration aq2 has exceeded a first threshold value S1.

If both conditions are not met at the same time, the method branches to block 306. This block queries whether WLD_AN=true is met and whether WLD_NA=true has also been met. If not, the method branches to block 308, which marks the end of the method according to the present invention. If, on the other hand, both conditions are met, flag WLD=true is set in block 307. This means that both wheels on the inside of the curve have lifted. The method then goes on to block 308. It branches from block 308 back to block 300 and starts all over again.

However, if both conditions in block 305 are met, a verification is made as to whether torque Mmot output by the engine is less than or greater than zero, i.e., whether the vehicle is in overrun mode (Mmot<0) or acceleration mode (Mmot>0).

If the check in block 310 reveals that Mmot<0 (i.e., the vehicle is in overrun mode), a further query takes place in block 320. This query checks whether aq1_NA>S2. In this case, Aq1_NA is the transverse acceleration calculated from the rotational speeds of the non-driven wheels. If this condition is met, flag WLD_NA=true is set in block 321. This means that the non-driven axle wheel on the inside of the curve has lifted. However, if the condition in block 320 is not met, the method goes directly to block 322. Block 321 also supplies an output signal to block 322.

A further query takes place in block 322: aq1_AN>S3? In this case, aq1_AN is the transverse acceleration calculated from the rotational speed difference of the wheels of the driven axle. If this condition is not met, the method branches to block 306. However, if this condition is met, flag WLD_AN=true is set in block 323, i.e., the driven wheel on the inside of the curve has lifted. The method then also goes on to block 306.

The case of Mmot>0 is discussed next. The condition in block 310 is not met, and the vehicle is in acceleration mode. Therefore, the first query in block 330 is aq1_AN<S4. In this case, ag1 is the transverse acceleration calculated from the rotational speeds of the driven wheels. S4 is a selectable threshold value. If the condition in block 330 is not met, the method goes on to block 332. If the condition is met, flag WLD_AN=true is set in block 331, i.e., a driven wheel has lifted. The method then also goes on to block 332.

Flag Four_WD is queried in block 332: Four_WD=true? This checks whether all-wheel drive has been activated. The status of the non-driven wheel is thus queried.

If all-wheel drive has been activated, i.e., if Four_WD=true, query aq1_NA<S5 takes place in block 333. In this case, a transverse acceleration is calculated from the rotational speed difference of the non-driven wheels. It is to be noted that, in this case, the "non-driven wheels" are engaged with the drive by the all-wheel drive controller, i.e., they are also driven. If the condition in block 333 is met, variable WLD_NA=true is set in block 334, i.e., the "non-driven" wheel on the inside of the curve has lifted (once again, it must be kept in mind that this wheel is driven in the present operating mode due to activation of all-wheel drive). However, if this condition is not met, the method branches to block 306. It also cycles from block 334 to block 306.

However, if condition 332 is not met, a query ag1_NA>S6 takes place in block 335. S6 is a selectable threshold value. These wheels are not driven, for all-wheel drive was determined to be inactive in block 332 (Four_WD=false). If the condition in block 335 is not met, the method branches to block 306; however, if the condition is met, determination WLD_NA=true takes place in block 336, i.e., the non-driven wheel on the inside of the curve has lifted. The method then goes on to block 306.

Blocks 306, 307, and 308 have already been described. It is possible to branch from block 308 back to block 300. In this case, the method begins cycling from the beginning again.

Figure 3:
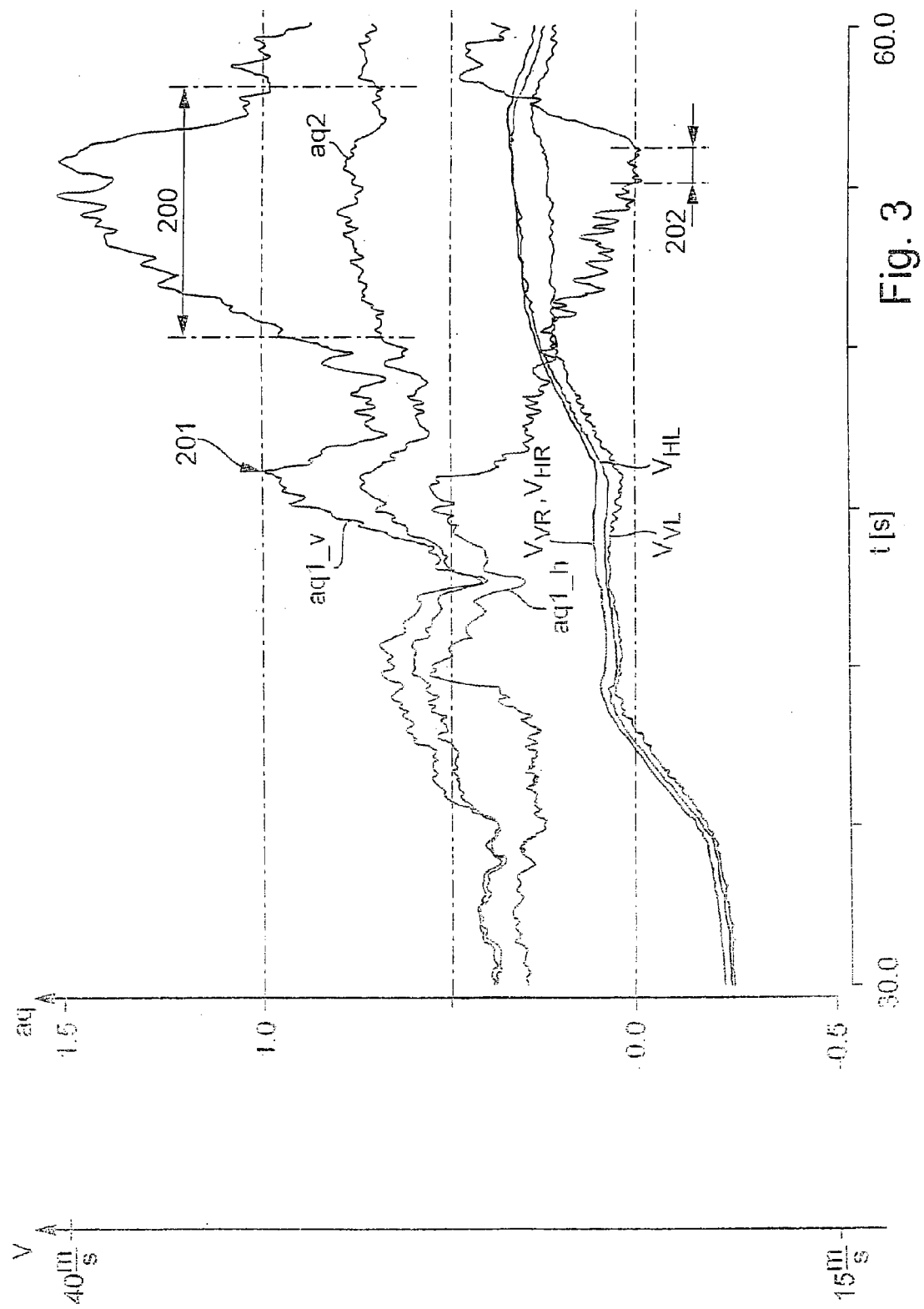
FIG. 3 shows the functioning of the present invention on the basis of measured signal curves.

FIG. 3 is discussed next. In FIG. 3, time t is shown in seconds in the abscissa direction. Two axes are shown on the left in the ordinate direction. Wheel rotational speed v in m/s is plotted along the left ordinate axis, while the transverse acceleration is plotted in units of gravity acceleration g along the right ordinate axis.

The curves shown in FIG. 3 are now explained:

the top curve is transverse acceleration aq1_v calculated on the basis of the wheel rotational speeds of the front axle;

followed by measured transverse acceleration aq2;

the third curve from the top is transverse acceleration aq1_h calculated on the basis of the wheel rotational speeds of the rear axle.

The ordinates referenced by aq apply to these curves in the ordinate direction.

The lower 4 curves shown are as follows (from top to bottom):

rotational speeds $v_{VR}$ of the right front wheel and $V_{HR}$ of the right rear wheel;

rotational speed $v_{HL}$ of the left rear wheel; and rotational speed $v_{VL}$ of the left front wheel.

The ordinates referenced by v apply to these curves in the ordinate direction.

Rotational speeds $v_{VR}$ of $v_{HR}$ are nearly identical. This has to do with the fact that the curves are determined while the vehicle is traveling in circles, always steering to the left. This means that the two right wheels are the wheels on the outside of the curve and therefore have minimal slip and no lift risk.

Time t is plotted in seconds in the abscissa direction.

The vehicle is a rear-drive vehicle. During the illustrated test drive, the left front wheel was determined to have lifted twice:

the left front wheel lifted briefly at time 201; and the left front wheel lifted during the entire time interval 200.

The left rear wheel was determined to have lifted during time interval 202.

Figure 4:
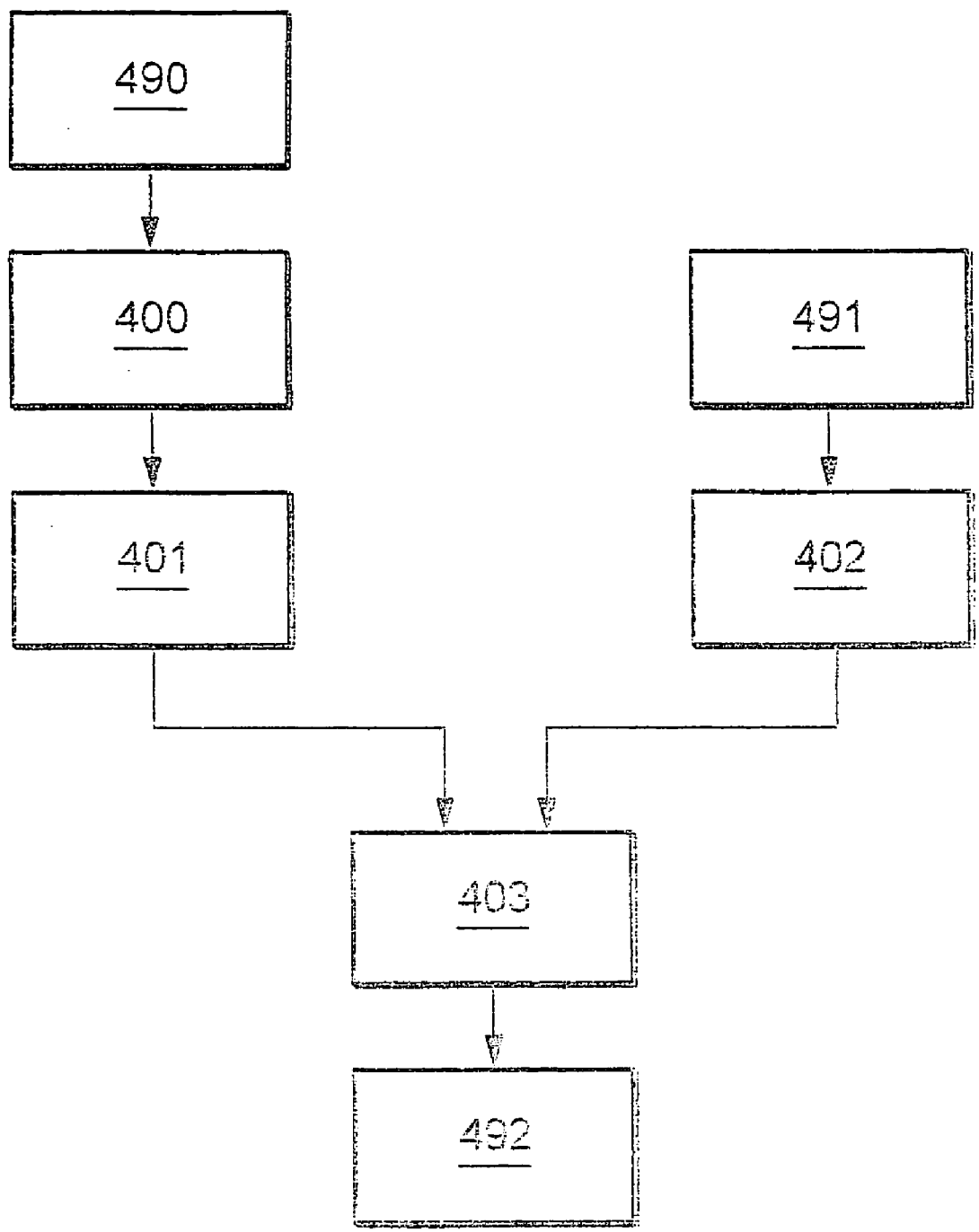
FIG. 4 shows the layout of the device for detecting transverse-dynamically hazardous operating states.

FIG. 4 shows the layout of the device for detecting a transverse-dynamically hazardous operating state. The blocks have the following functions:

Block 400: wheel rotational-speed sensing means

Block 401: first vehicle transverse-dynamics sensing means

Block 402: second vehicle transverse-dynamics sensing means

Block 403: operating-state detection means

Block 490: first sensor means (e.g., wheel rotational speed sensor)

Block 491: second sensor means (e.g., transverse acceleration sensor)

Block 492: actuator means (e.g., brakes, engine controller, etc.) or driver information means (e.g., display, acoustic signal, etc.)

First sensor means 490 supplies its signals to wheel rotational-speed sensing means 400. The latter supplies its signal to first vehicle transverse-dynamics sensing means 401. Second sensor means 491 supplies its output signals to second vehicle transverse-dynamics sensing means 402. Blocks 401 and 402 supply their output signals to operating-state detection means 403. Block 403 supplies its output signals to block 492.

What is claimed is:

1. A method of detecting a transverse-dynamically hazardous operating state of a vehicle, comprising:

determining a variable describing a rotational speed of at least one wheel on an axle;

determining a first variable describing a vehicle transverse dynamics from at least the variable describing the rotational speed;

determining at least one second variable describing the vehicle transverse dynamics from a sensor signal;

detecting a transverse-dynamically hazardous operating state at least as a function of the first variable and the second variable, the transverse-dynamically hazardous operating state corresponding to one of when the at least one wheel on the axle lifts off a roadway and when an imminent danger of the at least one wheel lifting off the roadway is present;

determining the transverse-dynamically hazardous operating state as a function of an engine torque acting upon the axle; and while determining the transverse-dynamically hazardous operating state, determining whether the axle is one of driven and non-driven.

2. The method as recited in claim 1, wherein:

the imminent danger of the at least one wheel lifting off the roadway is present when a slip of the at least one wheel on the axle has a value that is substantially different from zero.

3. The method as recited in claim 1, wherein:

the first variable and the second variable represent a transverse acceleration.

4. The method as recited in claim 3, wherein:

the transverse-dynamically hazardous operating state is detected only if an amount of transverse acceleration exceeds a predefinable threshold value.

5. The method as recited in claim 1, further comprising:

if the axle is driven, determining whether the vehicle is in one of an acceleration mode and an overrun mode by evaluating the engine torque acting upon the axle.

6. The method as recited in claim 1, wherein:

the transverse-dynamically hazardous operating state is detected by evaluating inequalities that include the first variable and the second variable, and a form of the inequalities is determined by the engine torque acting upon the axle.

7. A device for detecting a transverse-dynamically hazardous operating state of a vehicle, comprising:

an arrangement for determining a variable describing a rotational speed of at least one wheel on an axle;

an arrangement for determining a first variable describing a vehicle transverse dynamics from at least the variable describing the rotational speed;

an arrangement for determining at least one second variable describing the vehicle transverse dynamics from a sensor signal;

an arrangement for detecting a transverse-dynamically hazardous operating state at least as a function of the first variable and the second variable, the transverse-dynamically hazardous operating state corresponding to one of when the at least one wheel on the axle lifts off a roadway and when an imminent danger of the at least one wheel lifting off the roadway is present;

an arrangement for determining the transverse-dynamically hazardous operating state as a function of an engine torque acting upon the axle; and an arrangement for determining while the transverse-dynamically hazardous operating state is being determined, whether the axle is one of driven and non-driven.

* * * * *